Aug. 6, 1968  R. K. DATTA  3,396,118
STRONTIUM MAGNESIUM ORTHOPHOSPHATE PHOSPHORS
Filed Feb. 18, 1965
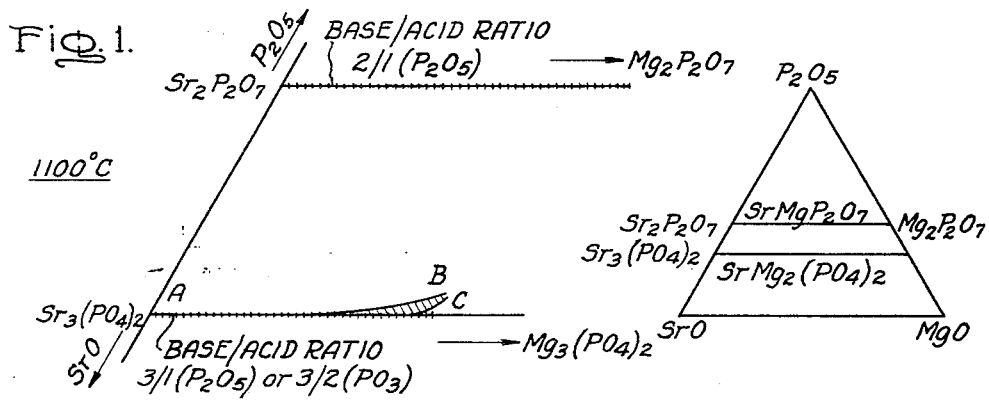
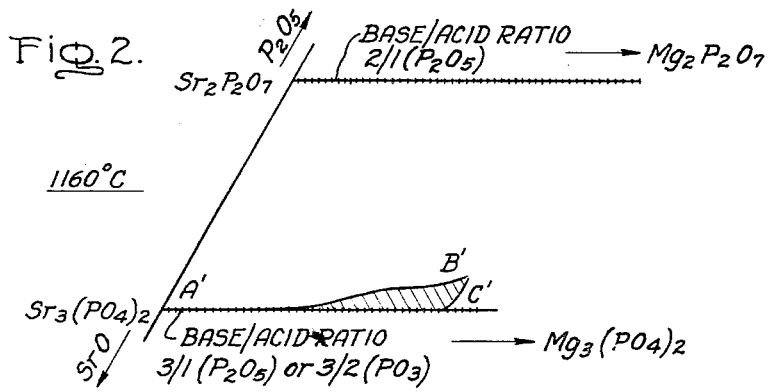
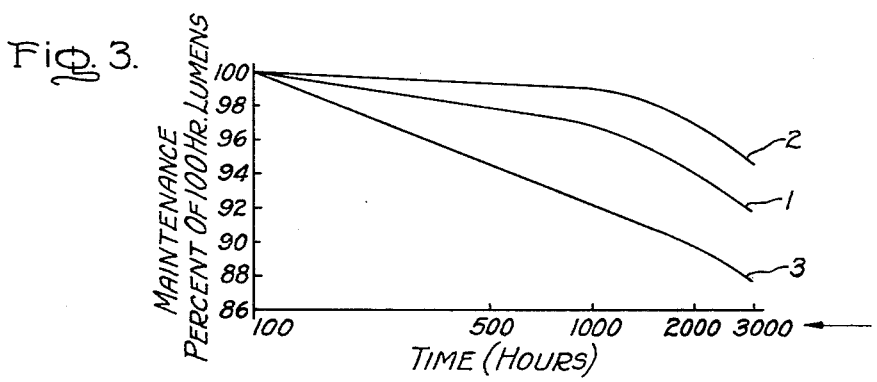
Inventor:
Ranajit K. Datta
by Ernest W. Legree
His Attorney

United States Patent Office 3,396,118
Patented Aug. 6, 1968

3,396,118
STRONTIUM MAGNESIUM ORTHOPHOSPHATE
PHOSPHORS
Ranajit K. Datta, East Cleveland, Ohio, assignor to
General Electric Company, a corporation of New
York
Filed Feb. 18, 1965, Ser. No. 433,628
3 Claims. (Cl. 252—301.4)

This invention relates to an improved strontimum magnesium orthophosphate phosphor and to the method for its preparation.

Strontium magnesium orthophosphate activated by bivalent tin emits yellow-white light upon excitation by ultraviolet rays, which may be emitted for instance by high pressure or low pressure mercury vapor discharge lamps. On account of its good efficiency at high temperatures, this phosphor is particularly suitable for use as a coating on the outer envelope or jacket of high pressure mercury vapor discharge lamps. In such application, it increases the total light output of the lamp and serves also, by reason of its yellowish color, to offset the blue color of the mercury discharge and achieve a whiter light.

Strontium magnesium orthophosphate as described in U.S. Patent 3,110,680, Koelmans et al. consists of $\beta$ strontium orthophosphate activated by 0.1 to 10 mole percent of bivalent tin, and in which a portion of the strontium is replaced by magnesium to the extent that the ratio of magnesium to strontium atoms lies between 0.02 and 0.50. According to this specification the phosphors are prepared by firing at temperatures between 1000 and 1100° C.

The process of preparing tin-activated strontium magnesium orthophosphate prior to my invention is illustrated by the following. Materials are used having the high degree of purity required for the production of luminescent substances, commonly referred to as phosphor grade. A typical batch formulation comprises:

| Grams of: | Gm.-moles |
|---|---|
| $SrCO_3$, 7.38 | 0.05 (SrO) |
| $(NH_4)_2HPO_4$, 5.55 | 0.042 ($PO_4$) |
| SnO, 0.055 | 0.0004 (SnO) |
| $MgCO_3$ (100% $MgCO_3$), 0.84 | 0.01 (MgO) |

After mixing, grinding and screening, the mixture is fired by heating at 1000 to 1100° C. for about 3 hours. The samples are then cooled, milled, and screened. The powder obtained has a white appearance but it does not yet luminesce. The powder is refired at 1000 to 1100° C. for about 30 minutes in an atmosphere of nitrogen containing about 0.2 to 1% hydrogen, a mixture which might be referred to as a nitrogen-diluted forming gas. The powder is then cooled to room temperature, still in the same nitrogen-diluted forming gas atmosphere, and after milling and screening is ready to be applied to a lamp. The product has a white appearance and luminesces yellow-white under 2537 A. excitation. This method of preparation follows essentially the teachings of the aforementioned Koelmans et al. patent.

The objects of this invention are to provide strontium magnesium orthophosphate phosphor which is improved in brightness and maintenance, and which exhibits greater resistance to damage caused by exposure to 1850 A. radiation, along with a practical method of preparing it. Other objects and advantages will become apparent as the invention is described with reference to the examples to follow and to the drawing wherein:

FIG. 1 is a phase equilibrium diagram for the system $SrO-MgO-P_2O_5$ at 1100° C.;

FIG. 2 is a similar diagram for the same system at 1160° C.; and

FIG. 3 shows comparative maintenance-life curves.

Through phase and structure studies of phosphors prepared by the Koelmans process outlined above, I have found that the resulting phosphor product is ordinarily a composite of orthophosphate and pyrophosphate phases rather than the assumed single orthophosphate phase. The presence of such free pyrophosphate has been found to be detrimental from the point of view of optimum performance in lamps. In such mixtures of ortho and pyrophosphate phases resulting from equilibrating the material at the firing temperature, a redistribution of bivalent strontium and magnesium ($Sr^{++}$ and $Mg^{++}$) between the two phases takes place at relatively low temperatures (500° C.) such as are encountered when the phosphor cools after firing or during lehring in lamp making. The result of the redistribtuion is to change the composition of both phases away from the optimum.

Strontium orthophosphate can exist in two physically different forms, the $\beta$ or high temperature form and the $\alpha$ or low temperature form. It is only the $\beta$ form of strontium orthophosphate which is luminescent. As the temperature drops, the $\beta$ form converts back to $\alpha$ and the brightness falls. The addition of magnesium slows down the rate of change of $\beta$ to $\alpha$ but an excess of magnesium also causes loss of brightness. Thus when the occurrence of ortho and pyrophosphate phases causes a redistribution of bivalent strontium and magnesium to occur between the two phases, the result is a loss in brightness of the orthophosphate phase. The pyrophosphate phase is luminescent but its maintenance is poor and its blue color is not suitable for the intended application.

In accordance with my invention, I have discovered that certain rather narrow composition ranges can be specified which do not lead to the formation of free pyrophosphate as a separate phase provided the proper firing temperature is used. FIG. 1 is a diagram showing part of the phase equilibrium relation of the system $SrO-MgO-P_2O_5-SnO$ at 1100° C. Inasmuch as the small amount of Sn (0.024 mole per 2 moles of $PO_4$) added as activator in the phosphor was found to have very little effect on the phase equilibrium relation of the system $SrO-MgO-P_2O_5-SnO$, for all practical purposes the latter can be represented by the simpler ternary system $SrO-MgO-P_2O_5$. A good phosphor is obtained when the composition contains only the $\beta$-Sr orthophosphate phase with a ratio of acid ($PO_4$) to base ($Sr^{++}+Mg^{++}+Sn^{++}$) slightly in excess over the stoichiometric proportion, and with the least amount of Mg sufficient to preserve the $\beta$ structure on cooling. In the phase diagram the inlay shows the compositional relationship within the system. The upper stippled horizontal line represents a 2:1 base/acid ratio where the oxide basis of the is $P_2O_5$; the lower stippled horizontal line represents a 3:1 base/acid ratio where the basis is $P_2O_5$, or a 3/2 base/acid ratio where the oxide basis of the acid is $PO_3$.

Magnesium-poor samples wherein the magnesium content is less than 10 mole percent relative to total cations present and wherein there is excess of $PO_4$ over the stoichiometric proportion of the orthophosphate, always show the presence of pyrophosphate phase when equilibrated at 1100° C. However, I have found that a very narrow field of cation-deficient homogeneous orthophosphate phase wherein the base/acid ratio equals 2.97/2 to 2.95/2 can be delineated at 1100° C. In determining the base/acid ratio, all cationic elements are included, that is, the mole fractions of $Sr+Mg+Sn$ are added together. Referring to FIG. 1, the field in question is represented by the cross-hatched area ABC. Any composition represented by a point lying on the lines AB, AC or within the cross-hatched area ABC between these lines is homogeneous and gives only orthophopshate phase on equilibration at about 1100° C. Any composition above the line AB would show a mixture of both ortho and pyrophosphate phases; any composition below the line AC would show another multiphase mixture.

I have further found that with increase in firing temperature beyond 1100° C., the area of the cation-deficient homogeneous orthophosphate field become enlarged. Referring to FIG. 2, the enlarged field at 1160° C. is shown cross-hatched bounded by A'B'C'; the upper boundary is extended toward $P_2O_5$ while the lower boundary remains substantially unchanged. This shows that samples having less magnesium and a lower base/acid ratio than 2.95/2 would still give only orthophosphate phase when heated to an appropriate temperature above 1100° C. By way of example, one sample having a low magnesium content (about 0.2 mole of MgO per 2 moles of $PO_4$) with a base/acid ratio of 2.72/2 gives both ortho and pyrophosphate phases when fired at about 1100° C., but only orthophosphate phase when fired at about 1160° C. The temperature range over which a homogeneous orthophosphate phase may be obtained is from approximately 1100° C. to 1180° C. At temperatures higher than 1180° C., a liquid phase appears indicating that is not possible to reduce the amount of magnesium further by heating samples above this temperature.

For any temperature from 1100° C. to 1180° C., an area of solid solubility corresponding to a homogeneous orthophosphate phase may be delineated on the tri-coordinate phase diagram for that temperature. At 1100° C., the area is a small one, as seen in FIG. 1. At higher temperatures, the area is larger, as seen in FIG. 2 corresponding to 1160° C. One may visualize a three-dimensional representation with temperature as the additional or Z-axis coordinate normal to the planes of the tri-coordinate phase diagrams. This would yield a solid space or body bounded at the low temperature end by the 1100° C. plane where solid solubility begins to appear, and at the high temperature end by the 1180° C. plane beyond which the mix becomes glassy. The remaining boundaries of the body are the curbed planes passing through the points ABC, A'B'C', etc. for the temperatures from 1100° C. to 1180° C.

For any firing temperature selected within the stated range, a base/acid may be found within the range from 2.97/2 to 2.70/2, and a corresponding molar proportion of MgO within the range from 0.37 to 0.20 per 2 moles of $PO_4$ which results in maximum brightness. The molar proportion of SnO will fall in the range from 0.02 to 0.03 mole per 2 moles of $PO_4$.

Specific compositions with correlated firing temperatures giving higher powder brightness are given by the following examples:

EXAMPLE 1

Base/acid ratio _____ 2.95/2–2.97/2
MgO _____per 2 moles of $PO_4$__ 0.33–0.37
SnO _____moles/2 moles of $PO_4$__ 0.024
Temp. _____° C__ 1100

EXAMPLE 2

Base/acid ratio _____ 2.72/2–2.75/2
MgO _____per 2 moles of $PO_4$__ 0.2–0.25
SnO _____per 2 moles of $PO_4$__ 0.024
Temp. _____° C__ 1160

Of the two composition above, that of Example 2 is preferred for high pressure mercury vapor lamps in which it gave better maintenance.

This is indicated in FIG. 3 wherein curve 1 shows the maintenance or percentage of 100 hour brightness achieved with the product of Example 1 fired at 1100° C.; curve 2 shows the maintenance with the product of Example 2 fired at 1160° C.; and curve 3 shows the maintenance with a non-homogeneous phosphor fired below 1100° C. according to the Koelmans patent and serving as a control. The data are indicated out to 3000 hours of burning. It will be observed that both Examples 1 and 2 are definitely superior to the control and Example 2 is superior to Example 1 for this application.

All of the primary requirements for a good strontium magnesium orthophosphate phosphor, namely (a) low magnesia content, (b) base/acid ratio slightly less than stoichiometric (3/2), and (c) absence of any pyrophosphate phase, are temperature-dependent factors. Therefore, from the phase-equilibrium point of view, it may be expected that for a given composition of the phosphor, there will be an optimum firing temperature. I have confirmed that this in fact is the case, as may be seen from the difference in results obtained using the identical compositions at different firing temperatures, as shown by the two following examples:

| Molar Ratio | | | $PO_4$ | Total Cation/$PO_4$ | Firing Temp., ° C. | Percent Relative Brightness |
|---|---|---|---|---|---|---|
| Sr | Mg | $Sn^{++}$ | | | | |
| Ex. 3___ 2.576 | 0.3 | 0.024 | 2 | 2.9/2 | 1,100 | 85 |
| Ex. 4___ 2.576 | 0.3 | 0.024 | 2 | 2.9/2 | 1,170 | 92 |

In the foregoing, the percent relative brightness for the identical composition is increased from 85 to 92 when the firing temperature is changed from 1100 to 1170° C.

At firing temperatures higher than 1180° C. or in the presence of amounts of Mg greater than 0.37 mole per 2 moles of $PO_4$, the products become sintered, glassy or liquid and are not useful. At Mg proportions less than 0.20 mole per 2 moles of $PO_4$, the stability of the β-orthophosphate phase cannot be preserved at the relatively slow cooling rate required for large scale phosphor production.

I have thus found that the selection of extremely narrow composition ranges from the suitable broader ranges or the prior art, along with the use of appreciably higher firing temperatures, leads unexpectedly to truly single phase materials distinguished by higher powder brightness and improved lamp performance.

What I claim as new and desire to secure by Letters Patent of the United States is:

1. A tin-activated strontium magnesium orthophosphate phosphor comprising strontium magnesium orthophosphate produced by firing at temperatures between 1100 to 1180° C. a mixture wherein the base/acid ratio, being the ratio of total cations consisting of Sr, Mg and Sn to anions consisting of $PO_4$ is between the limits of 2.97/2 to 2.70/2, the firing temperature being in excess of 1100° C. and closer to 1180° C. according to the departure of the base/acid ratio from 2.97/2 towards 2.70/2, at the same time as the proportion of magnesium is between the limits of 0.37 to 0.20 mole per 2 moles of $PO_4$, and the proportion of Sn is between the limits of 0.02 to 0.03 mole per 2 moles of $PO_4$, and such that the resulting fired produce is a homogeneous crystal phase without contamination by separate pyrophosphate or glassy phases.

2. A tin-activated strontium magnesium orthophosphate phosphor comprising strontium magnesium β-orthophosphate free of pyrophosphate phase produced by firing at 1100° C. a mixture wherein the base/acid ratio, being the ratio of total cations consisting of Sr, Mg and Sn to anions consisting of $PO_4$ is from 2.95/2 to 2.97/2, the proportion of Mg. is from 0.33 to 0.37 mole per 2 moles of $PO_4$, and the proportion of SN is about 0.024 mole per 2 moles of $PO_4$.

3. A tin-activated strontium magnesium orthophosphate phosphor comprising strontium magnesium β-orthophosphate free of pyrophosphate phase produced by firing at 1100° C. a mixture wherein the base/acid ratio, being the ratio of total cations consisting of Sr, Mg and SN to antions consisting of $PO_4$ is from 2.72/2 to 2.75/2, the proportion of Mg is from 0.2 to 0.25 mole per 2 moles of $PO_4$, and the proportion of Sn is about 0.024 mole per 2 moles of $PO_4$.

(References on following page)

References Cited

UNITED STATES PATENTS 3,110,680    11/1963    Koelmans et al. _____ 252—301.4

FOREIGN PATENTS 1,307,926    9/1962    France.
  990,629    4/1965    Great Britain.

OTHER REFERENCES

Koelmans et al., Luminescence of Modified Tin-Activated Strontium Orthophosphate, Journal of the Electrochemical Society, July 1959, pp. 442–445.

TOBIAS E. LEVOW, *Primary Examiner.*

R. D. EDMONDS, *Assistant Examiner.*